United States Patent
Appel

[19]

[11] 3,975,686
[45] Aug. 17, 1976

[54] LOSS SIGNAL GENERATION FOR DELTA-MODULATED SIGNALS

[75] Inventor: Ulrich Appel, Munich, Germany

[73] Assignee: International Business Machines Corporation, Armonk, N.Y.

[22] Filed: Mar. 20, 1975

[21] Appl. No.: 560,422

[52] U.S. Cl. ............................ 325/38 B; 179/2 R
[51] Int. Cl.² ........................................ H03K 13/22
[58] Field of Search .......... 325/38 B, 62; 179/1 VL, 179/2 DP, 84 VF, 170.2, 170.4, 15 AP, 15 BY, 15 BF, 15 BW, 15 BL, 2 R; 178/69 R

[56] References Cited
UNITED STATES PATENTS

| | | | |
|---|---|---|---|
| 3,131,258 | 4/1964 | O'Neill, Jr. | 178/66 R |
| 3,568,061 | 3/1971 | Brolin | 325/38 B |
| 3,647,993 | 3/1972 | Foulkes et al. | 179/2 DP |
| 3,777,066 | 12/1973 | Nicholas | 325/38 B X |

*Primary Examiner*—Benedict V. Safourek
*Attorney, Agent, or Firm*—Robert Lieber

[57] ABSTRACT

A digital communication system employs delta-modulation coders and decoders for voice signal conversion. Signal inequalities at remote ends of a coder-decoder connection, due to unscheduled momentary interruptions of the transmission channel, are adjusted by insertion of a special pseudo-random "noise" signal at the remote demodulator. Voice Activity Compression (VAC) processing circuits, operating upon integrated digital signals which represent the analog (voice) input to the delta-modulation coder, are utilized to develop line activity indications. These indications are processed to produce VAC "channel use" information which is sent over a separate channel for remote demultiplexing control. The same activity indications are used to control remote demodulation handling and line level restoration. The remote control circuits insert the special pseudo-random signal at the remote demodulator during interruptions of the voice transmission (indicated as inactivity). The inserted signal adjusts the demodulator output level to correspond to the noise level at the input to the modulator. The demodulator signal is thereby reproducible as "natural" audible noise, consequently avoiding leaving the remote listener with the unnatural and disconcerting impression of a "dead" connection.

13 Claims, 4 Drawing Figures

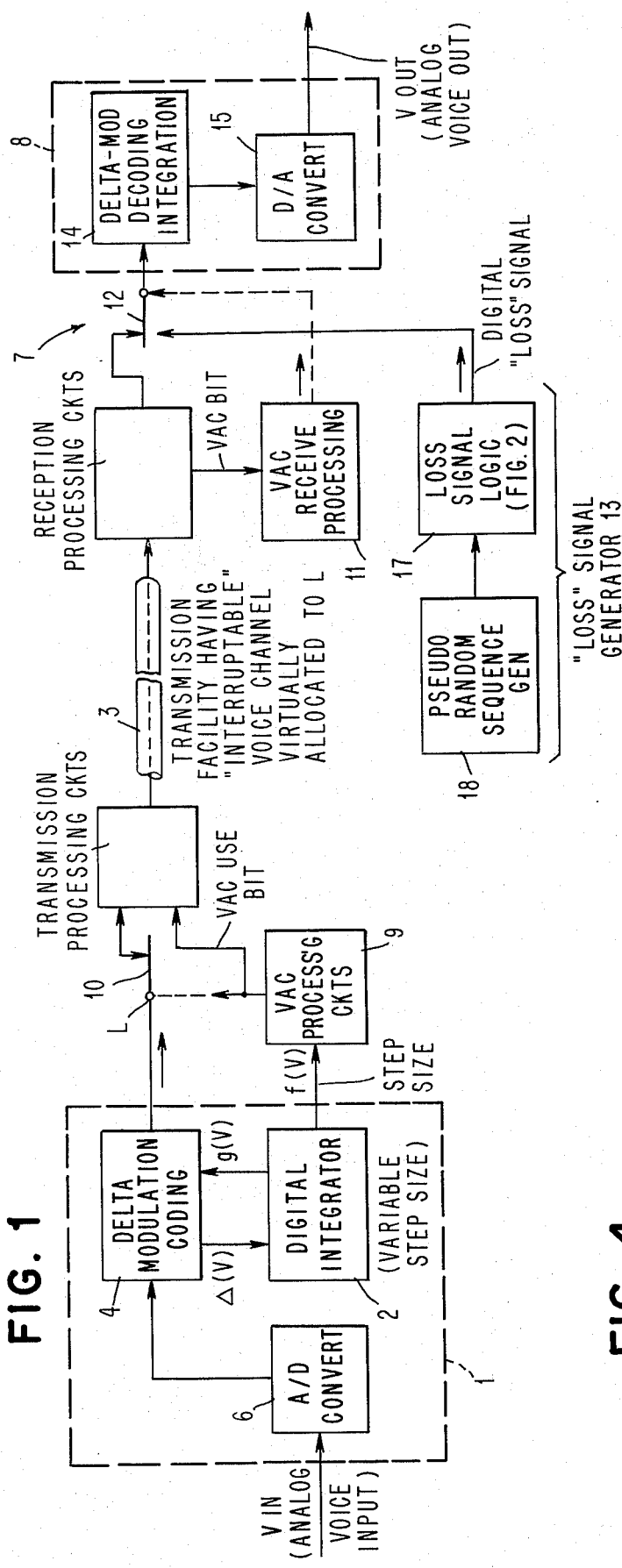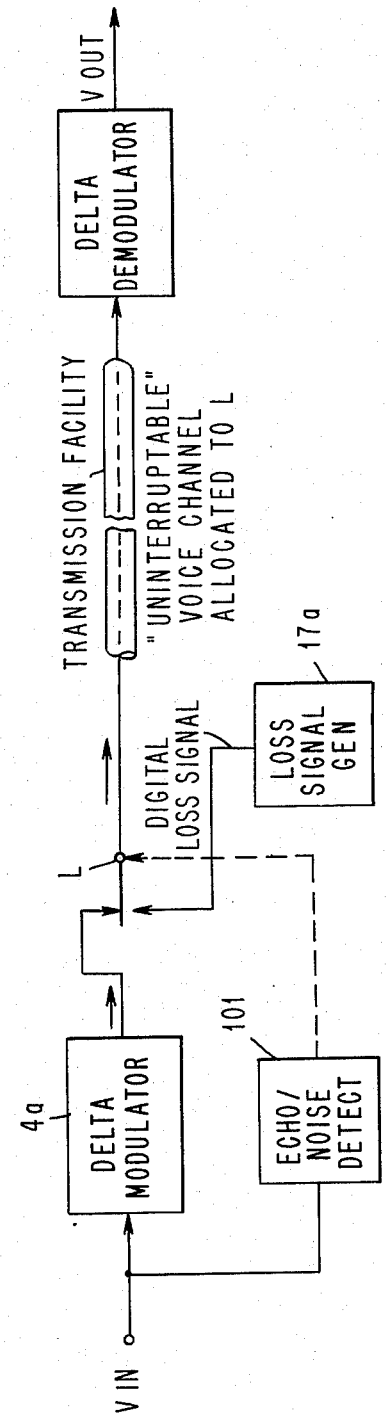
FIG. 1
FIG. 4

FIG. 2 LOSS SIGNAL LOGIC
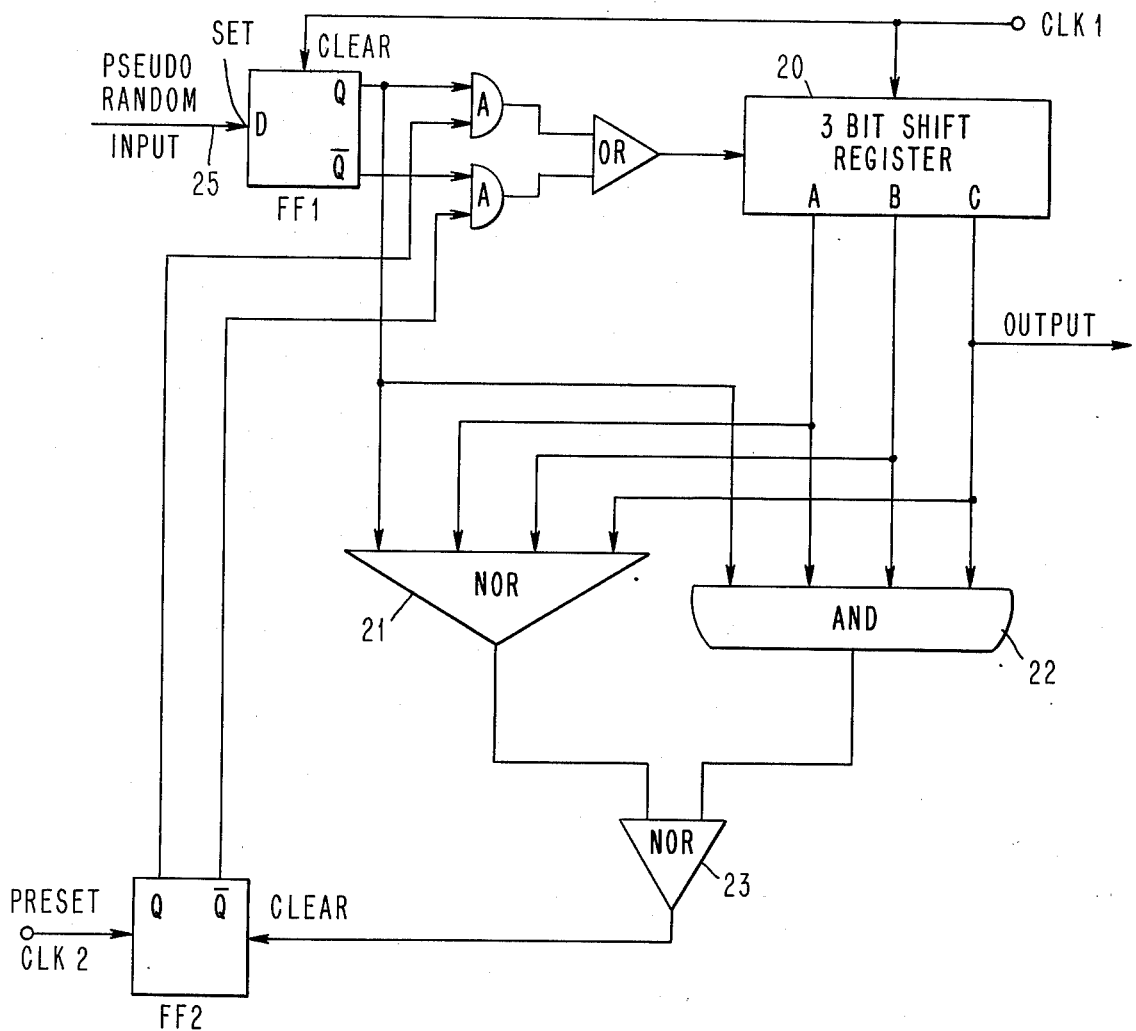
FIG. 3
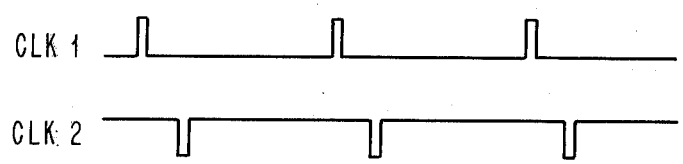

LOSS SIGNAL GENERATION FOR DELTA-MODULATED SIGNALS

CROSS-REFERENCES TO RELATED PATENTS AND APPLICATIONS

U.S. Pat. No. 3,821,494 granted June 28, 1974 to Besseyre.

U.S. Pat. application, entitled "Digital Voice Signaling With Digital Echo Detection and Voice Activity Compression Used to Cancel Echo", by P. Abramson and U. Appel, Ser. No. 560,423, filed Mar. 20, 1975 assigned to the assignee of the present application.

Application Ser. No. 537,211 by H. G. Markey et al, filed Dec. 30, 1974, entitled "Access Method and Station Apparatus for Compressed Handling of Digital Voice and Data Signals Relative to a High Speed TDMA Facility" and assigned to the assignee of this application.

BACKGROUND OF THE INVENTION

1. Field of the Invention

The invention relates to digital voice signal transmission circuits employing delta-modulation coding and decoding.

2. Statement of the Problem

In long haul transmission circuits for telephone communication the transmission channel may be intermittently interrupted, either for echo cancellation purposes or to permit time multiplex handling of other transmissions. It is well known, however, that total disconnection causes an unnatural and disconcerting reception effect of total silence giving the listener the impression that the connection has been broken.

In certain analog systems the problem is avoided by loss insertion. Instead of completely disconnecting the channel a high loss (e.g. 50 db) is switched into the transmission path. However, it is believed that this technique has not hitherto been applicable to a digital voice signal channel employing delta-modulation coding.

3. Environmental Background

The present invention is effective and convenient to use in the virtual connection TDM communication system described and claimed in the above cross-referenced patent application by Markey et al; the disclosure of said application being incorporated herein by this reference. In said system voice activity compression (VAC) processing and signaling circuits distinguish pauses in speech and momentarily "interrupt" a virtual transmission connection between a local delta-modulation coder serving a "talking" subscriber and a remote delta-modulation decoder serving a remote "listening" subscriber. This permits the channel used in the connection to be momentarily assigned to other virtual connections.

The delta-modulation coding circuits in the above system operate in concert with a "digital" integrator circuit receiving adaptive step-size integrand arguments. The integrator is used for companding and activity discrimination. In the code generation operation present and predicted digital representations of the analog (voice) input are recurrently compared. The predicted value is based on the previous binary sequence of delta-modulation code output. The code bit (difference) is quantized as a step-size integrand value proportioned to the latest representational value of the integration result. The step-size value is added digitally to or subtracted from the latest integration value according to the delta-modulation comparison result.

When the representational value of the step-size integrand falls in a range above a predetermined threshold activity level (e.g. −33 dbm) a voice activity indication is produced which is used by the VAC processing circuits to control allocation of a shared transmission channel for completing the virtual connection to the remote demodulator and listener. Since the step size is proportional to the representational value it can be used in the logical detection of threshold activity. If the step-size value is below the activity threshold the voice transmission channel "connection" is interrupted (allocated to another virtual connection). Information indicating the status of transmission channel utilization is recurrently transmitted via the VAC signaling facility (over another channel) for use in controlling demultiplexing.

Aspects of the variable step-size generation and activity detection are variously described in Vol. 16, No. 11 of the IBM Technical Disclosure Bulletin at Pages 3702–3705 and 3709–3710.

SUMMARY OF THE INVENTION

According to the present invention whenever the transmission channel for delta-modulated voice is momentarily interrupted (e.g. by operation of VAC processing circuits as explained above) information remotely indicating the interruption (e.g. the channel use information transferred via the VAC signaling facility) is used remotely to cause insertion of a special pseudo-random digital signal at the demodulator. The inserted signal comprises an essentially random bit sequence having the property that no more than n of any consecutive bits are equal; where n is a number associated with the "threshold" step size. The insertion effectively reduces the output of the remote demodulator to a low volume noise signal below the threshold level associated with the threshold step size.

A similar bit sequence may be inserted on the transmission side of an "unshared" delta-modulation channel to produce loss insertion effects in transmission and/or to "reset" an integrator associated with a delta-modulation coder.

The foregoing and other features, aspects, objects and advantages of the present invention will be appreciated from the following detailed description.

DETAILED DESCRIPTION OF THE DRAWINGS

FIG. 1 schematically illustrates the system orientation and utilization of the invention for delta-modulation transmission via a shared (interruptable) voice transmission channel;

FIG. 2 schematically illustrates the logic for generating the pseudo-noise "loss insertion" signal according to the invention for the exemplary case $n = 3$;

FIG. 3 illustrates timing (clock) signals for the logic circuit of FIG. 2; and

FIG. 4 illustrates the "transmit side" application of the subject invention for echo suppression relative to an unshared delta-modulation transmission channel.

Referring to FIG. 1 in a typical application for delta-modulation transmission over a shared channel, for instance in the system disclosed in the above-referenced and herewith incorporated disclosure by Markey et al., analog voice signals Vin are first delta-modulation coded in modulation circuits 1. A digital integrator 2 having a variable step-size argument provides companded digital representations tracking the volume intensity (magnitude) of Vin. The delta-modulation code is transmitted over virtually allocated channels of a transmission facility 3. In the system disclosed by Markey et al the transmission facility includes common control traffic-dependent switching circuits and a time division multiplex (TDM) multiple access satellite communication segment.

The coding section 4 of circuits 1 compares the digital output of analog-to-digital converting circuit 6 to a predicted value $g(V)$ which is an uncompanded digital function of the previous coding history. The difference $\Delta V$ is used both as the present delta-modulation code value (for signaling at L) and to control addition or subtraction of the step-size factor $f(V)$ to the latest integration result. The representational value of $f(V)$ is varied as the volume level represented by $g(V)$ varies through predefined range limits.

At the remote demodulation station 7 the signal from the source line L is extracted from the shared (virtual) channel and passed via associated line L' to demodulation circuits 8 which provide analog signal Vout corresponding to Vin.

Voice Activity Compression (VAC) processing circuits 9, operating relative to circuits 2 at the transmitting station, determine when $f(V)$ represents a predetermined noise (inactive) level and disconnect source line L from facility 3 (e.g. by transfer of schematically shown switch contact 10 to another virtual connecton, not shown). VAC mask information is sent over another channel to VAC receiving circuits 11 to indicate momentary "interruption" of the channel from L to L' (as suggested above the interrupted channel may then be allocated to another virtual connection not shown). Circuits 8 are connected (e.g. via switch circuit 12 shown schematically) to loss signal generator 13 which supplied binary signals in a pseudo-random sequence (long recurrence interval) subject to the logical constraint that not more than $n$ of any consecutive bits have equal binary values; where $n$ is an integer associated with the integrand step size used in the integration section 14 of demodulation circuit 8. Upon input to circuits 8 this sequence reduces the step size value progressively to a range below a threshold value and causes Vout to appear as an audibly reproducible low volume noise-like sound readily distinguishable from a dead line.

With the possible exception of circuits 13 all circuits in the foregoing environmental/applicational system are considered fully disclosed in the above-referenced Besseyre Patent, Markey et al. application and IBM Technical Disclosure Bulletin references.

FIG. 2 shows the logic 17, for constraining the pseudo-random sequence output of circuit 18 in accordance with the invention, for the case $n = 3$ (maximum number of consecutive equal bits is 3 for threshold activity). The pseudo-random input signal supplied by conventional pseudo-random signal generator 18, preferably a signal having a long recurrence time characteristic, operates flip-flop FF1. The alternately effective outputs Q and $\overline{Q}$ of FF1 are gated with respective outputs of a second flip-flop FF2 to condition successive inputs to 3-stage shift register 20. NOR circuit 21 and AND circuit 22 logically process outputs of register 20 and FF1 as described below and condition NOR circuit 23 to effectively cause inversion of the fourth bit of any sequence of four equal bits coincidentally manifested by the shift register and FF1. The extension for other values of n is considered obvious from the following discussion.

At clock times clk2 (FIG. 3) FF2 is preset to the complement of its "clear" state. In this state output Q of FF2 is enabling and $\overline{Q}$ is disabling. At clock times clk 1 register 20 is shifted and the state of FF1 is effectively shifted into the first (A) stage of register 20 if FF2 is in the preset state. FF1 is simultaneously reset to its cleared state (Q enabling). If input line 25 thereafter receives a signal representing a 1 bit the set (D) input of FF1 is pulsed to invert the state of FF1 (to Q enabling) before the next shift pulse clk1.

AND circuit 22 responds to the coincident presence of all 1's in register 20 and FF1 (representing a sequence of four consecutive 1 bit inputs at 25) to condition NOR circuit 23 to activate the "clear" input of FF2 setting FF2 to its clear state. This reversely conditions the logic between FF1 and register 20 to shift the complement of the state of FF1 (e.g. a 0) into register 20 at the next clk1.

Similarly NOR 22 responds to coincidence of all 0's in register 20 and FF1 (representing an input sequence of four consecutive 0 bits) to clear FF2 and invert the shift input from FF1 to register 20.

Thus, the fourth bit in any sequence of 4 equal bits received at 25 is effectively inverted in shift transit to register 20.

FIG. 4 indicates that the "loss" signal for reducing received ouput to low volume noise level can be inserted at the transmission side of an "unshared" transmission channel to produce the effect of noise level attenuation in the transmission path. The insertion may be used for echo suppression. Thus, echo control circuits 101 responsive to echo in the signal processed by delta-modulator circuits 4a may be used to control operation of contact L into the position for connecting output of loss generator circuit 17a (identical to circuit 17, FIG. 1) into the transmission path.

While the invention has been particularly shown and described with reference to preferred embodiments thereof, it will be understood by those skilled in the art that various changes in form and detail may be made therein without departing from the spirit and scope of the invention.

What is claimed is:

1. In combination:
    a first source of delta-modulation coded serially recurrent digital signals representing audibly reproducible sound effects having intelligibility distinct from noise;
    a second source of delta modulation coded serially recurrent digital signals useful upon demodulation to produce audible "weak" noise effects distinct from "dead silence;" said noise signals having a pseudo-random pattern of bits subject to a predetermined constraint imposed upon the number of equal-valued bit elements which can occur consecutively;
    a delta-modulation decoding circuit for converting delta modulation code to signals to audible sound signals; and
    means for selectively coupling said decoding circuit to receive signals from said first and second sources.

2. The combination of claim 1 wherein the said decoding circuit includes a digital integration circuit employing a selectively varied integrand step size and the constraint imposed upon said second source sequence is related to a predetermined representational value of step size employable by said integration circuit; whereby decoded signals produced in response to signals received from said second source are reproducible as low volume noise audible sound effects distinguishable from dead silence.

3. The combination of claim 1, wherein said first source is physically remote from said decoding circuit and subject to linkage therewith via a transmission facility; in combination with means for determining when either said link is in a blocked condition or when signals being conveyed from said first source to said facility represent either echo intelligence or unintelligible noise and means responsive to said determination to link said decoding circuit with said second source and thereby effect insertion of said synthetic noise as an audible effect.

4. The combination of claim 3 wherein said second source, selective coupling means and decoding circuit are physically co-stationed, and said determining means is operative in response to control signals carried over said facility to effect said synthetic noise insertion.

5. The combination of claim 4 wherein said control signals are developed by means remotely co-stationed with said first source and are related to the state of utilization of a shared transmission channel of said facility by said first source and other sources sharing said channel.

6. The combination of claim 3 wherein said first and second sources and said selective coupling means are co-stationed physically remote from said decoding circuit and said selective coupling means is subject to communication coupling with said decoding circuits via said transmission facility.

7. In combination:
a first source of delta-modulation coded signals representing original telephone sounds;
a second source of serially recurrent binary signals having a pseudo-random pattern of bit recurrence subject to a predetermined constraint imposed upon the number of equal-valued elements which can occur consecutively;
a delta-modulation decoding circuit including a digital integration circuit having a variable digital step-size integrand for generating a companded integration result; and
means for selectively coupling said delta-modulation decoding circuit to receive inputs alternately from said first and second sources,
said input from said second source characterized in that it causes the representational value of the integration result to vary in a random manner below a predetermined "noise" activity threshold representational level whereby the output of said decoding cricuit is reproducible as low volume audible noise readily distinguishable from dead silence.

8. The combination of claim 7 wherein said first source is situtated physically remote from said decoding circuit and subject to communicaton coupling therewith by a transmission facility.

9. The combination of claim 8 including means costationed with said first source for transmitting signals via said facility to indicate the state of utilization of said facility relative to said first source, said transmitted indicating signals being utilized by said decoding circuit to control selection of the input coupling connection of said decoding circuit relative to said first and second sources.

10. The combination of claim 8 wherein said second source and said means for selectively coupling are co-stationed together with said first source and said means for selectively coupling is utilized selectively to transmit signals alternatively from said first and second sources in logical dependence upon the condition of intelligible activity at the output of said first source.

11. A system according to claim 10 wherein the condition of logical intelligibility determining the disconnection of said first source and connection of said second source relates to the echo content of the output of said first source.

12. In a system for transmitting telephone sound signals between multiple "talker" and "listener" line circuits, wherein signals originated at the talker lines are converted to delta modulation digital form before transmission and reconverted to analog form upon reception and wherein a reduced number of channels is utilized in said transmission by employment of TASI handling to assign channels only to talker signals representing original "talk" sound effects distinct from noise and/or echo, the improvement for eliminating dead silence effects on listener lines associated with talker circuits blocked by failing to receive TASI assignment to a said channel comprising:
means for generating binary digital signals in a pseudo-random bit sequence capable of synthetically producing weak noise effects when handled through circuits for effecting delta modulation to analog conversion; and
means associated with said reconversion relative to said listener circuits for inserting said signals produced by said generating means into the reconversion circuit path of each listener line associated with a blocked talker line.

13. In a system for transmitting telephone sound signals between continuously linked talker and listener line circuits, wherein signals originated at said talker circuits are converted to digital delta modulation form for transmission and reconverted to analog form upon reception, the improvement for limiting the volume level of noise transmitted during periods of inactivity and/or echo comprising:
means associated with said talker line circuits for generating binary digital signals in a pseudo-random sequence, said signals representing weak noise distinct from dead silence in delta modulated form;
means associated with said talker circuits for detecting when any said circuit is either in an inactive "pause" condition or carrying echo; and
means associated with said last named means for disconnecting said inactive or echo-carrying circuit from the transmission link and connecting the output of said pseudo-ramdom generating means in its place whereby the inactivity and/or echo is effectively suppressed without presenting a disturbing dead silence effect to the associated listener.

* * * * *